(12) United States Patent
Bernier et al.

(10) Patent No.: US 7,633,246 B2
(45) Date of Patent: Dec. 15, 2009

(54) PORTABLE LINEAR ACTUATOR AND A METHOD OF LIMITING THE MAXIMUM FORCE OF A MOTOR OF SUCH AN ACTUATOR

(75) Inventors: Frédéric Bernier, Chalons En Champagne (FR); Jean-Pierre Audinet, Saint Imoges (FR); Christophe Faucher, Reims (FR)

(73) Assignee: VIRAX, Epernay (FR)

( * ) Notice: Subject to any disclaimer, the term of this patent is extended or adjusted under 35 U.S.C. 154(b) by 186 days.

(21) Appl. No.: 11/632,343

(22) PCT Filed: Mar. 14, 2005

(86) PCT No.: PCT/FR2005/000608
§ 371 (c)(1),
(2), (4) Date: Jan. 19, 2007

(87) PCT Pub. No.: WO2006/018487
PCT Pub. Date: Feb. 23, 2006

(65) Prior Publication Data
US 2008/0024077 A1    Jan. 31, 2008

(30) Foreign Application Priority Data
Jul. 20, 2004   (FR)   ................... 04 08046

(51) Int. Cl.
*H02P 1/00*   (2006.01)
(52) U.S. Cl. ................ 318/135; 318/444; 318/632; 388/819
(58) Field of Classification Search ........... 318/135, 318/436, 444, 615, 632, 696; 388/838, 937
See application file for complete search history.

(56) References Cited

U.S. PATENT DOCUMENTS

| | | | |
|---|---|---|---|
| 4,042,868 A * | 8/1977 | Rhodes ................. 318/615 |
| 4,249,117 A | 2/1981 | Leukhardt et al. |
| 4,418,562 A * | 12/1983 | Sakai et al. ............ 72/444 |
| 4,467,250 A * | 8/1984 | Thomasson ............ 318/436 |
| 4,673,855 A * | 6/1987 | Boillat ................. 318/696 |
| 4,683,409 A * | 7/1987 | Boillat ................. 318/696 |
| 4,734,629 A * | 3/1988 | Lessig et al. .......... 388/819 |
| 4,763,219 A * | 8/1988 | Nakamura ............. 361/23 |

(Continued)

FOREIGN PATENT DOCUMENTS

DE   36 42 136   6/1988

(Continued)

*Primary Examiner*—Paul Ip
(74) *Attorney, Agent, or Firm*—Wenderoth, Lind & Ponack, L.L.P.

(57) ABSTRACT

A linear portable actuator including a direct current electric motor (2) rotationally driving a screw with the aid of a reduction element, wherein the motor (2) is controlled by an electronic module (5) comprising means (12) for the acquisition of instantaneous intensity of a supply current for the motor. Further, the electronic module (5) also comprises means (13) for calculating the differential coefficient in relation to supply-current intensity time, which are connected to means (14) for comparing the differential coefficient to a first predetermined value, and a comparing means controlling means (15) for switching off the supply current it the differential coefficient is greater than the first predetermined value.

21 Claims, 10 Drawing Sheets

U.S. PATENT DOCUMENTS

| | | | |
|---|---|---|---|
| 5,181,429 A * | 1/1993 | Sieber | 74/89.42 |
| 5,416,885 A * | 5/1995 | Sakoh | 388/838 |
| 5,440,219 A * | 8/1995 | Wilkerson | 318/802 |
| 5,479,958 A * | 1/1996 | Kummerfeld | 137/357 |
| 5,619,112 A * | 4/1997 | Younessi et al. | 318/689 |
| 5,814,962 A * | 9/1998 | Mizumoto | 318/600 |
| 6,175,205 B1 * | 1/2001 | Michenfelder et al. | 318/444 |
| 6,381,109 B1 | 4/2002 | Burtin et al. | |
| 6,488,180 B1 * | 12/2002 | Bayat | 222/137 |
| 6,979,971 B2 * | 12/2005 | Takamune et al. | 318/632 |
| 7,066,189 B2 * | 6/2006 | Tranovich et al. | 137/1 |
| 7,081,731 B2 * | 7/2006 | Asama et al. | 318/635 |
| 7,133,601 B2 * | 11/2006 | Phillips et al. | 388/804 |
| 7,276,878 B2 * | 10/2007 | Phillips et al. | 318/811 |
| 2002/0074866 A1 | 6/2002 | Morishima et al. | |
| 2003/0006729 A1 * | 1/2003 | Raymond | 318/687 |
| 2003/0184252 A1 * | 10/2003 | Takamune et al. | 318/632 |
| 2004/0215370 A1 * | 10/2004 | Asama et al. | 700/245 |
| 2005/0000580 A1 * | 1/2005 | Tranovich et al. | 137/625.65 |

FOREIGN PATENT DOCUMENTS

| | | |
|---|---|---|
| EP | 0 119 142 | 3/1984 |

\* cited by examiner

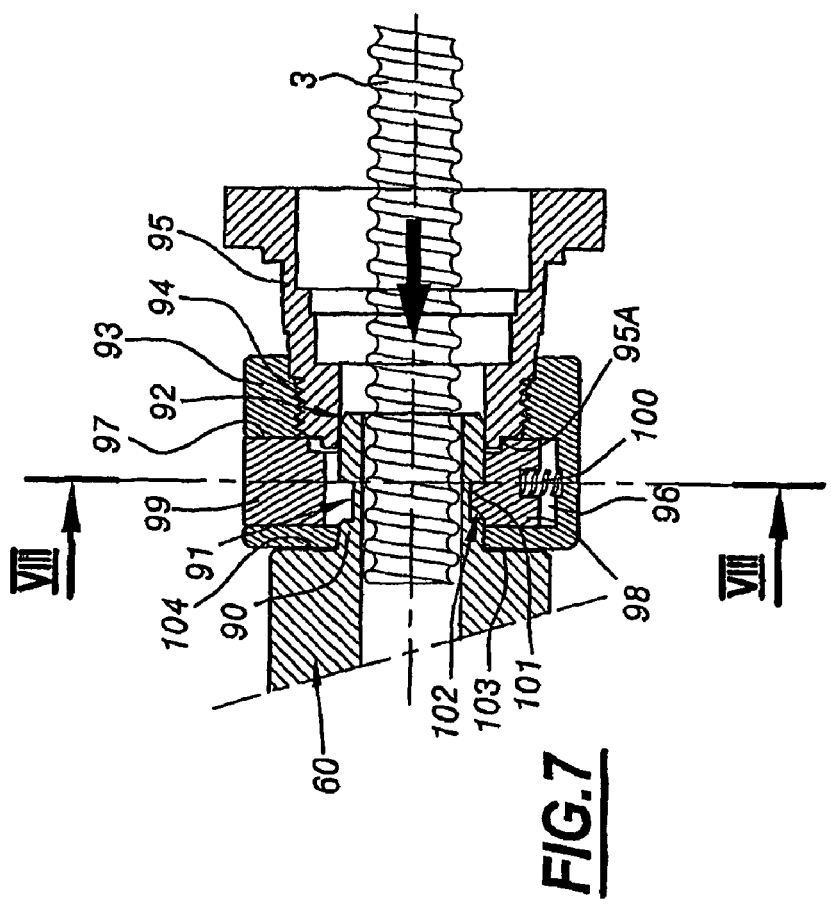
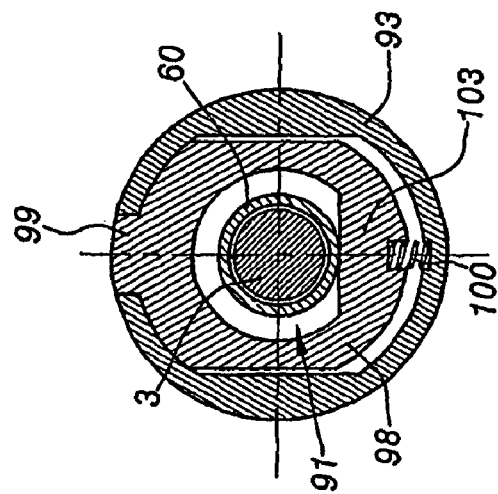
FIG.7
FIG.8

PORTABLE LINEAR ACTUATOR AND A METHOD OF LIMITING THE MAXIMUM FORCE OF A MOTOR OF SUCH AN ACTUATOR

BACKGROUND OF THE INVENTION

1. Field of the Invention

The present invention relates to a portable linear actuator, a method of controlling an electric motor of such an actuator to limit the maximum force generated thereby, and to the use thereof in a machine-part puller or in a tool for working on tubes. The invention also relates to a portable electromechanical tool for working on tubes and including such an actuator.

2. Description of the Related Art

Actuators are known that are capable of exerting forces on the basis of a direct current (DC) electric motor.

Such actuators are connected to specialized tools.

One example of such tools is a machine-part puller for pulling ball bearings. Another example concerns tools for working on tubes for expanding them.

Nevertheless, such actuators are often limited in the maximum force they are capable of producing.

Such actuators are confronted with two types of working situations.

In the first type of situation, the tool is in normal operation. The material against which the tool is applied thus presents resistance that means that the force to be provided by the motor is progressive up to a certain maximum working value which corresponds to the maximum working force on a loaded stroke of the actuator.

In the second type of situation, the tool is put into operation while unloaded. "Operating unloaded" is used to designate a situation in which a tool is connected to the actuator but the tool is not applied against any material or part. Since there is no material to oppose movement of the tool, the force exerted by the actuator is practically zero until the tool reaches the end of its stroke (e.g. because the tube expansion sectors of the tool are at the end of their stroke). Since the tool is then blocked, it generates an instantaneous force on the actuator that is extremely large.

The Applicant has thus observed that the force produced in the second situation can be more than 50% greater than the maximum working force.

This has the drawback of making it necessary to dimension the actuator mechanically in terms of its maximum unloaded force and not of its maximum working force, which in addition to increasing cost, also increases the weight and size of the actuator, and thus makes it less portable.

In addition, the reliability of the actuator is decreased by deteriorating the motor and the mechanism by the sudden increase in the magnitude of the force.

The object of the invention is to remedy those drawbacks.

BRIEF SUMMARY OF THE INVENTION

The invention provides a portable linear actuator.

In another aspect, the invention provides a method of controlling an electric motor of a portable linear actuator in order to limit the maximum force generated thereby.

In another aspect, the invention provides a portable electromechanical tool for working on tubes.

Advantageously, such a tool is a multipurpose machine for working on tubes, is portable, and is electromechanical.

The invention also provides the use of such an actuator in a machine-part puller for bearings, or in a tool for working on tubes for expanding them.

DETAILED DESCRIPTION OF THE DRAWINGS

The invention can be better understood in the light of the following description given purely by way of example, and making reference to the accompanying drawings, in which:

FIG. 7 is a section view of means for fastening a working head;

FIG. 8 is a section view of the means for fastening a working head on section line VIII-VIII of FIG. 7;

DETAILED DESCRIPTION OF THE INVENTION

Figure 1:
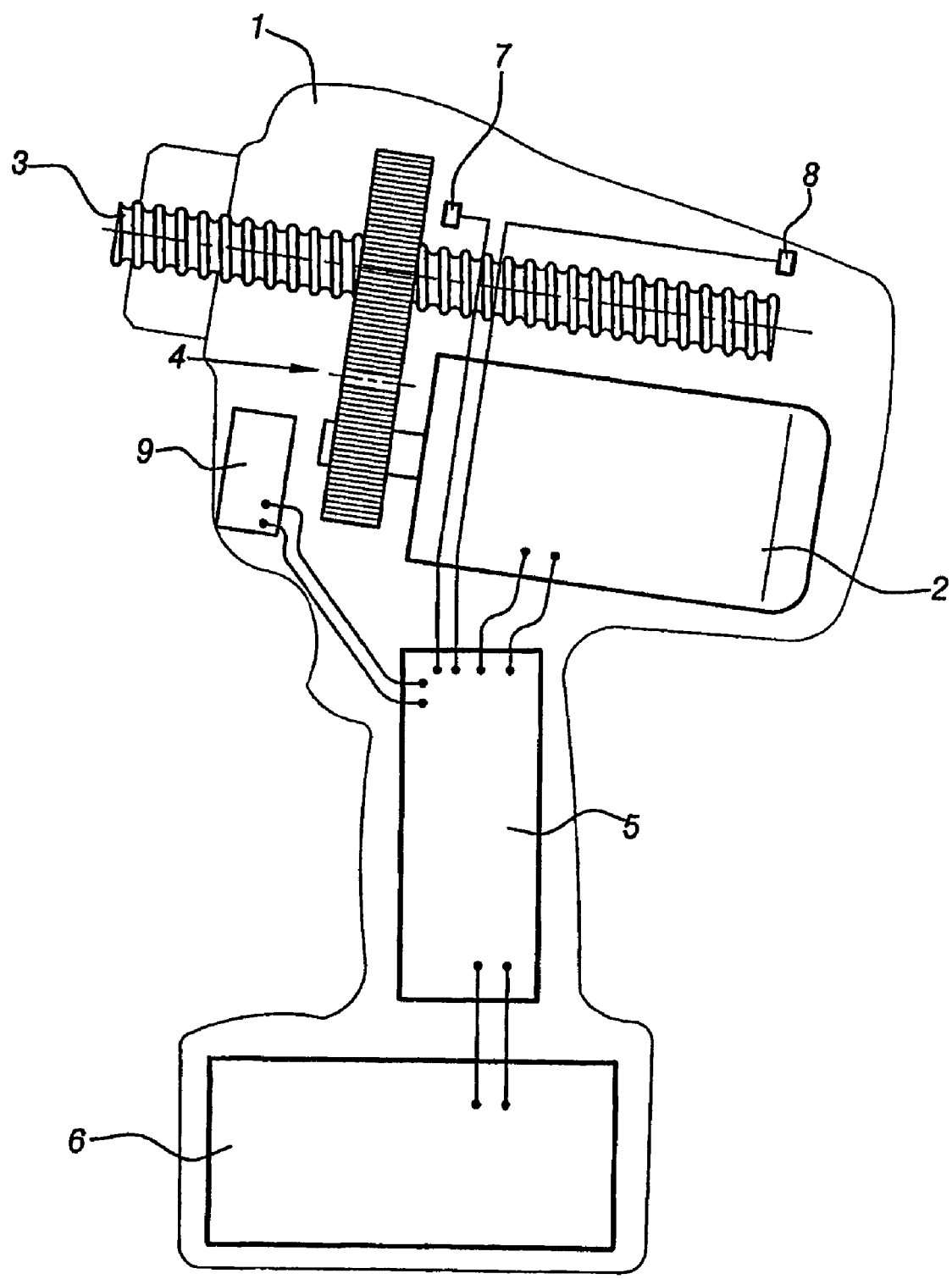
FIG. 1 is a diagram of an actuator.

A portable linear actuator 1, FIG. 1, comprises an electric motor 2 rotating a screw 3 via a stepdown gearbox 4 of conventional structure, e.g. of the epicyclic type. The screw 3 is preferably a recirculating ball screw which, as is well known, enables the rotary movement of the motor 2 to be transformed into movement in translation of the screw along its axis. Since the portable linear actuator 1 needs to be capable of delivering a large force, a recirculating ball screw which minimizes mechanical friction is particularly well adapted.

The electric motor 2 is controlled by an electronics module 5 which in particular controls the electrical power supplied to the motor from a battery 6.

End-of-stroke sensors 7 and 8 are also connected to the electronics module 5 in order to monitor the amplitude of the displacement of the screw 3. By way of example, the sensors 7 and 8 may be Hall effect sensors.

In conventional manner, the actuator also has a manual switch 9 in the form of a trigger so as to enable the user to control the movements of the actuator. The manual switch 9 is also connected to the electronics module 5.

Figure 2:
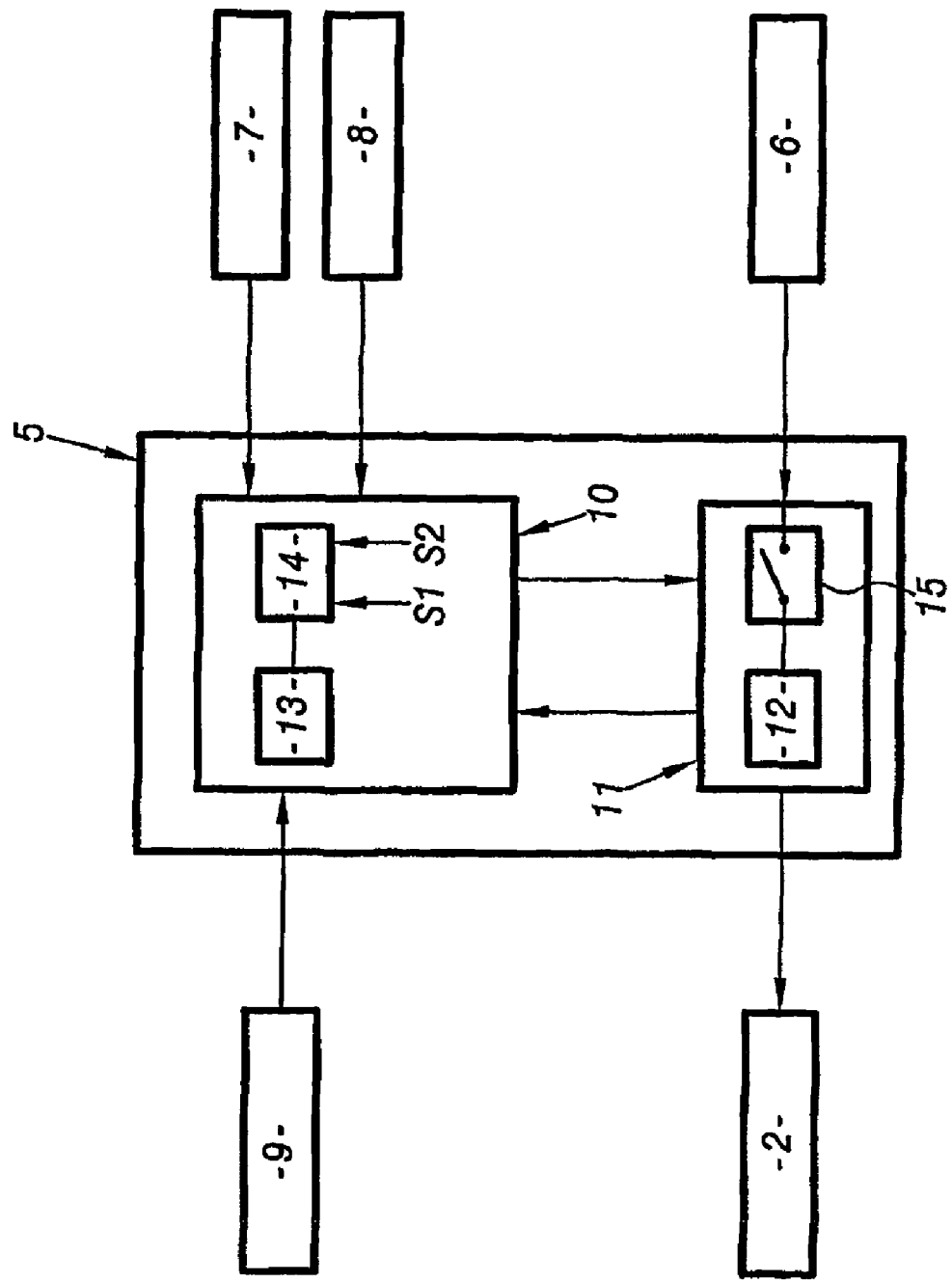
FIG. 2 is a block diagram of the electronics module of the FIG. 1 actuator.

The electronics module 5, FIG. 2, conventionally comprises a control module 10 comprising a microcontroller connected to a power module 11 that manages the supply of electricity to the motor 2 and that is thus interposed between the battery 6 and the motor 2.

The manual switch 9 and the end-of-stroke sensors 7 and 8 are connected to the control module 10.

The power module 11 has means 12 for acquiring the instantaneous magnitude of the current supplied to the motor 2. This acquisition is performed conventionally, e.g. by using a current-to-voltage converter connected to an analog-to-digital converter, or by using a MOSFET.

The acquisition means 12 thus provide the control module 10 with a numerical value that is representative of the instantaneous current being supplied to the motor 2.

The control module 10 also has calculation means 13 for calculating the time derivative of the power supply current.

It also includes means 14 for comparing the derivative with a first predetermined value S1 and for comparing the power supply current with a second predetermined value S2 in order to operate a switch 15 for cutting off the power supply to the motor 2 if the derivative is greater than the first predetermined value S1 or if the current is greater than the second predetermined value S2.

The operation of the actuator is explained with reference to FIG. 3.

Figure 3:
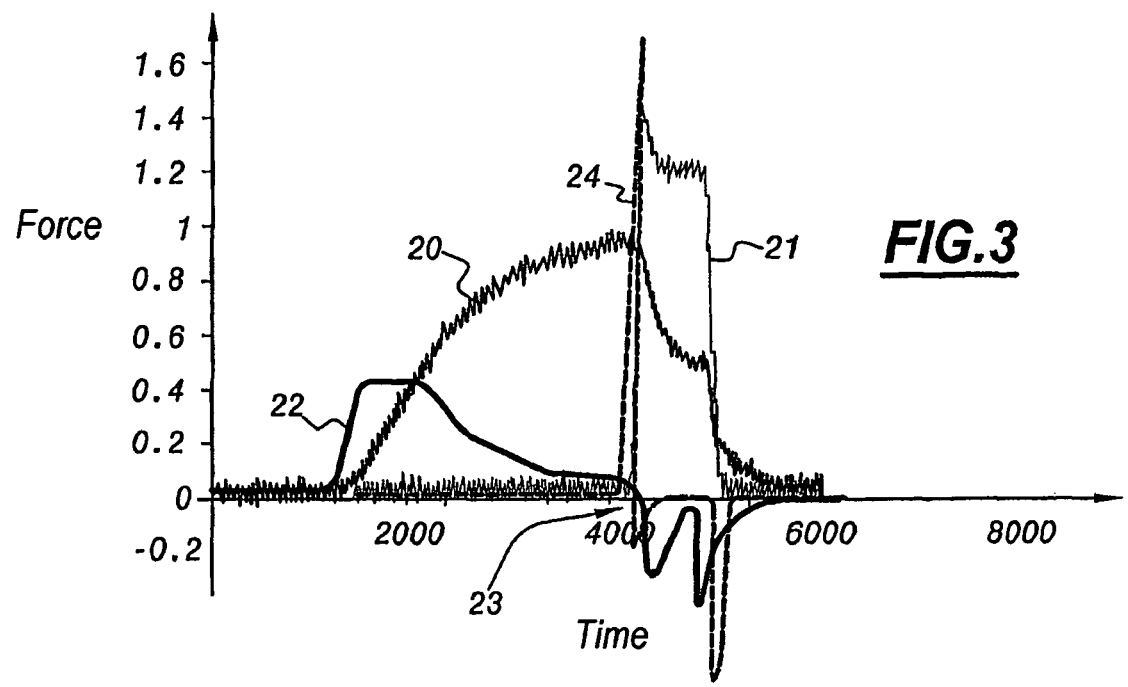
FIG. 3 is a graph plotting force as a function of time in a prior art actuator.

Observation of FIG. 3, which plots force as a function of time while the actuator is loaded in a curve 20, and while the actuator is operating unloaded in a curve 21, shows that when operating under load, the curve increases regularly before reaching a quasi-asymptote. The slope, i.e. the derivative, of the curve 22 is therefore never very high.

Conversely, the curve 21 shows that on becoming blocked at 23, growth is almost vertical so the slope is very steep, curve 24.

It is recalled that with a DC electric motor, there is a linear relationship between the current supplied to the motor and the force delivered thereby, so it will readily be understood that detecting a derivative of this current greater than a certain predetermined value is an indication of the actuator becoming blocked, and therefore requires the motor to be stopped by interrupting its power supply.

Figure 4:
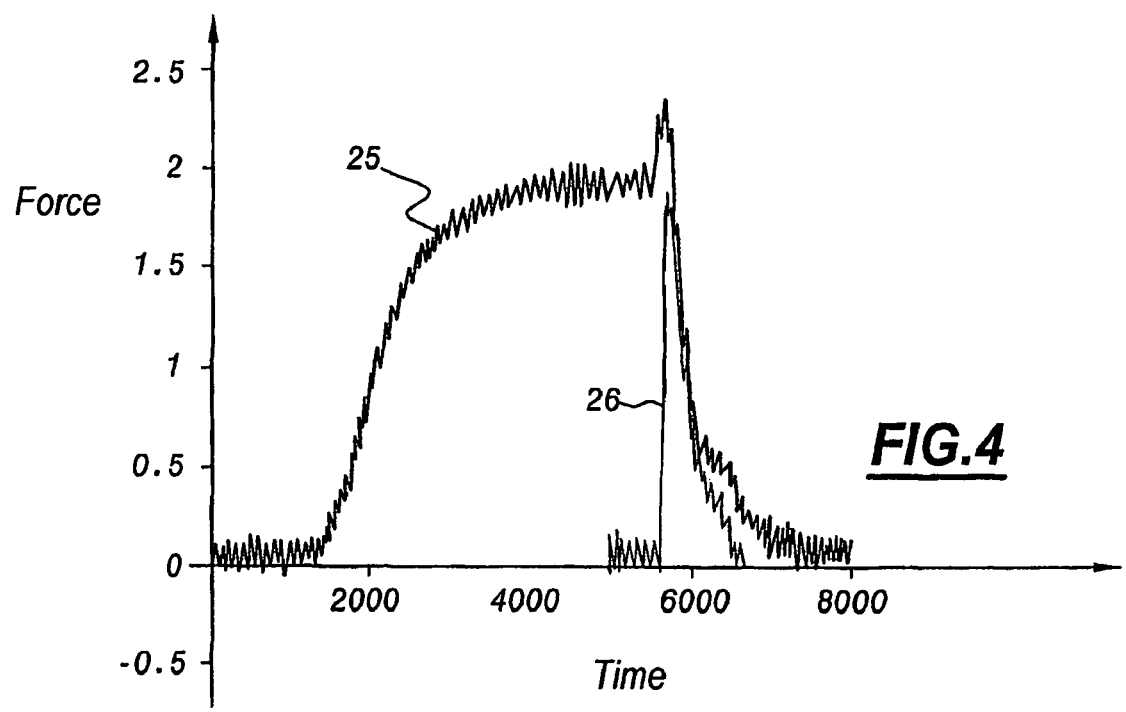
FIG. 4 is a graph plotting force for the actuator of FIG. 1.

FIG. 4 shows force curves in the two preceding situations, under load in curve 25, and with blocking after operating unloaded in curve 26, as they apply to an actuator including an electronics module as described above. It can be seen that detecting too great a derivative does indeed prevent the actuator from finding itself in a situation where it is delivering a force greater than the maximum useful force.

Figure 5:
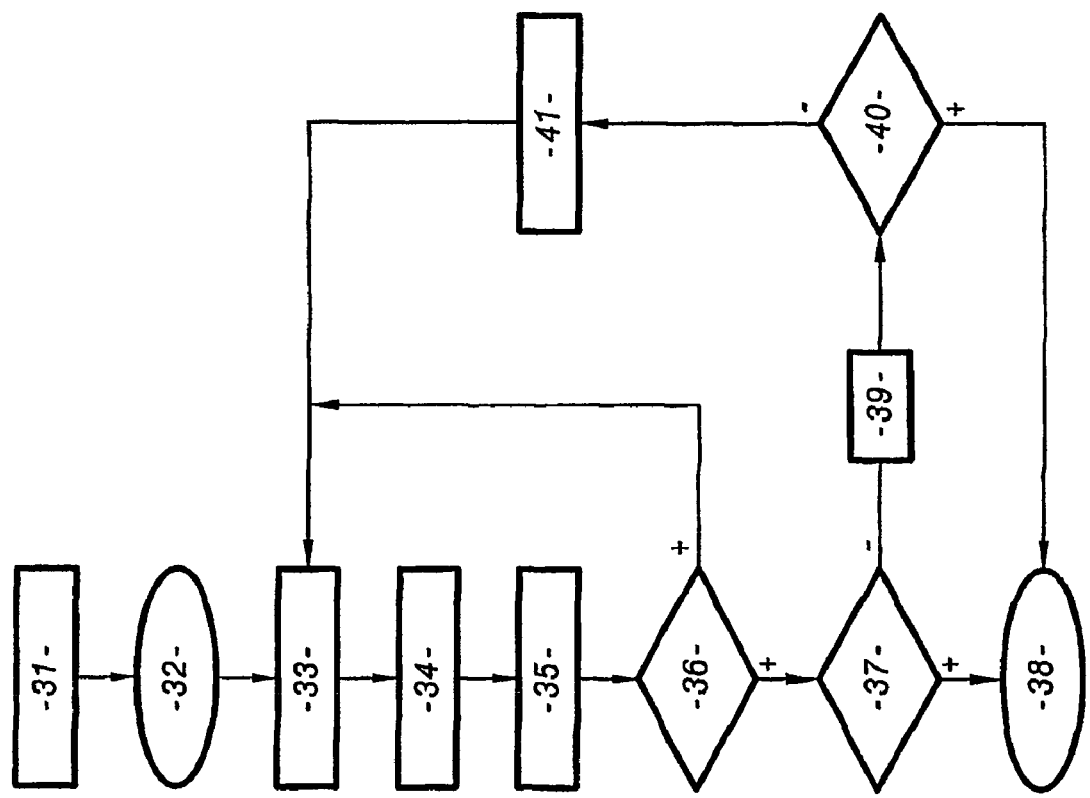
FIG. 5 is a control flow chart for the electronics module of the FIG. 1 actuator.

The method of controlling the electric motor 2 by the electronics module 5 is described in detail below with reference to FIG. 5.

After an initialization stage 31, the microcontroller waits for a motor start signal at 32 as delivered by the trigger 9. When the microcontroller receives at 32 the order to start, it causes power to be supplied to the motor. In parallel, it starts an inhibit time-out (not shown) during which no account is taken of acquisition signals in order to ignore transient starting phenomena, and it starts acquisition timing at 33 for acquiring values representative of the current supplied to the electric motor 2. This timing serves to acquire values at regular intervals.

Then, at 34, the microcontroller acquires a value representative of the current on which it performs signal processing at 35 in order to discriminate in particular between signal and noise.

If at 36 the inhibit time-out has not terminated, then new acquisition timing is triggered at 33. Else, the microcontroller at 37 compares the value of the current with a predetermined maximum threshold S2. This second predetermined value S2 serves to verify that the force does not exceed a maximum value.

If the magnitude of the current is greater than this maximum threshold, a power supply interrupt order is issued at 38. Else, the time derivative of the current is calculated at 39 and compared at 40 with the predetermined maximum value S1. If this derivative is greater than the maximum value S1, then the power supply is interrupted at 38, else the value of the current is recorded at 41 prior to starting timing for the following acquisition of current at 33.

It should be observed that if the acquisition timing performed at 33 is constant, i.e. if acquisition takes place at regular intervals, then the derivative can be calculated approximately by calculating the difference between two values acquired with a regular period, and the maximum slope is then replaced by a maximum difference. Thus, the electronics module 5 includes means for sampling at regular intervals, the calculation means storing the sampled values over a moving time window of predetermined duration, and then taking the difference between the values of the most recent current sample and of the oldest current sample, with the comparator means comparing the difference with the first predetermined value.

It is thus possible to retain the n most recent successive current values, where n is equal to 10, for example. These values can be stored in a first-in first-out (FIFO) type memory. The difference is thus taken between the present current value and the current value that was obtained n−1 intervals earlier.

The value selected for n is a compromise between maximizing the accuracy of the calculation microcontroller and the desired detection speed.

Timing means are also included to ensure that the interrupter means cannot be activated until after a predetermined length of time has elapsed after starting the actuator.

The end-of-stroke sensors 7 and 8 are connected to the electronics module 5 in such a manner that the power supply switch 15 is activated when these sensors detect that the screw is at the end of its stroke.

Figure 10:
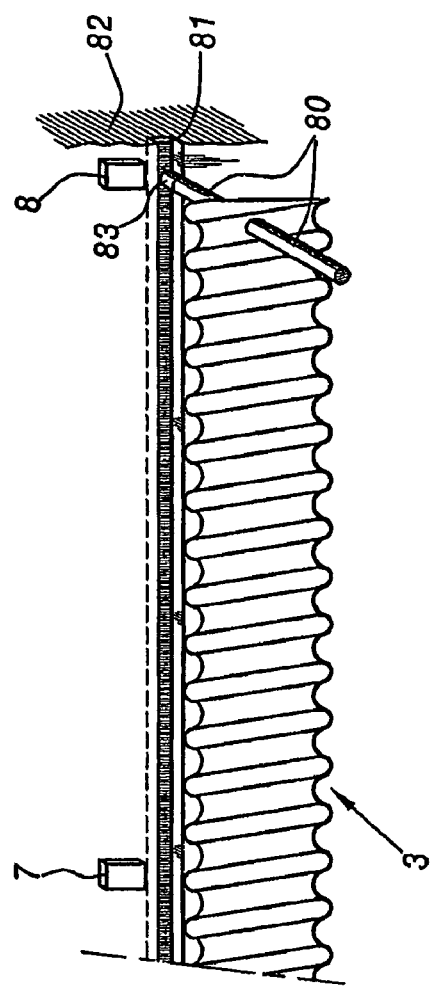
FIG. 10 is a perspective view of end-of-stroke sensors.

The operation of the end-of-stroke detectors 7 and 8 is described below with reference to FIG. 10.

The operating principle of a -recirculating ball screw implies that it is prevented from rotating so that the rotary movement of the nut containing the balls is transformed by the screw into movement in translation.

The recirculating ball screw 3 includes a transverse anti-rotation pin 80 with each end thereof sliding in a groove 81 of a stationary part 82 of the portable linear actuator 1.

The anti-rotation pin 80 has a magnet 83 at one of its ends.

In addition, the stationary guide part 82 includes, placed on the guide groove, two Hall effect sensors 7 and 8 which act as end-of-stroke detectors. Thus, the distance between the two sensors 7 and 8 defines the maximum stroke of the appliance.

When the magnet 83 goes past the Hall effect sensor it modifies the magnetic field of the sensor, thereby triggering a modification in the current flowing through the sensor. Appropriately positioning of these sensors thus makes it possible to inform the control electronic 5 that the recirculating ball screw 3 is reaching the end of its stroke.

In a variant embodiment, the guide part 82 comprises an electronics card having a plurality of locations adapted to receive Hall effect sensors.

Thus, a single electronics card can be used for one or more models of portable linear actuator having, in particular, different displacement lengths for their recirculating ball screws. During manufacture, the sensors are positioned at locations that are appropriate for the recirculating ball screw in question.

By limiting the force of the actuator in this way, it is possible to dimension the motor and the mechanical parts as a function solely of the maximum useful force. This produces an actuator that is less expensive and lighter in weight, and therefore more easily portable.

Furthermore, the motor is not subjected to any sudden large forces, thereby increasing its reliability.

This makes it possible to use the actuator with tools that require large forces. One example of such a tool is a puller of machine parts, in particular for pulling a bearing. Tools for working on tubes, in particular for expanding tubes are likewise tools that require large forces and that can therefore be used with this actuator.

One such electromechanical tool for working on tubes is described below with reference to FIG. 6.

Figure 6:
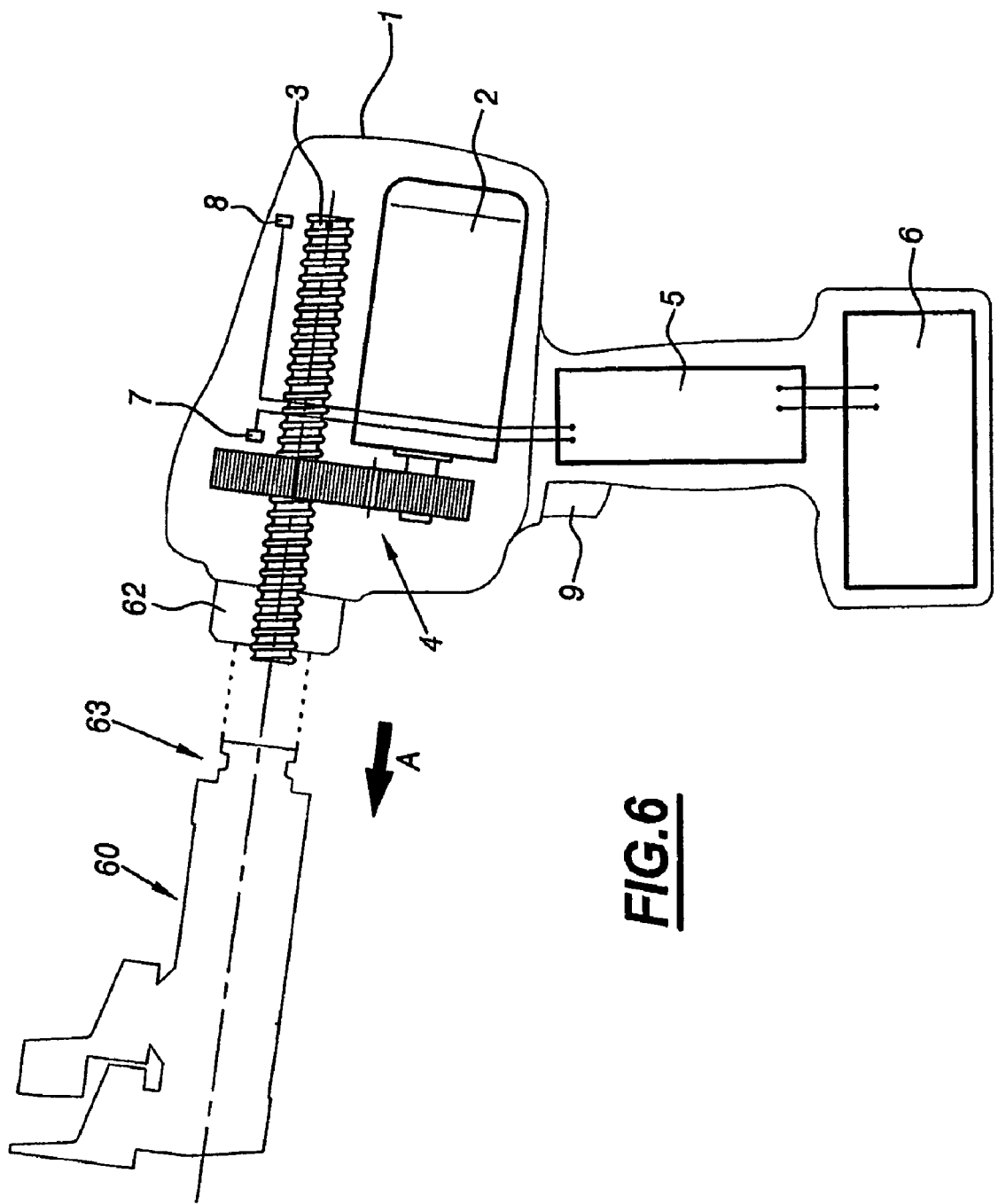
FIG. 6 is a diagrammatic exploded side view of a portable tool of the invention.

The portable tool for working on tubes comprises, FIG. 6, a portable linear actuator 1 as described above and at least two working heads, with one of those heads 60 being illustrated.

In the description below, terms such as "forwards", "outwards", "to the left" are synonyms designating movement caused by the recirculating ball screw in the direction of arrow A in FIG. 6, i.e. from the inside toward the outside of the portable linear actuator 1.

Similarly, since the orientations of the various drawings are identical, "front" corresponds to the left-hand portion of the items shown, and thus, for the portable linear actuator 1, to the end where the head 60 is attached.

The portable linear actuator 1 also has means 62 for fastening the working head, which means are in the form of a hollow cylindrical endpiece having the same axis as the recirculating ball screw 3.

Each specialized working head 60 has fastener means 63 complementary to the fastener means 62 of the portable linear actuator 1 for the purpose of fastening these heads 60 securely to the portable linear actuator 1 in releasable manner.

The main characteristics of the fastener means 62, 63 are to enable the head 60 to be fastened quickly on the portable linear actuator 1, to withstand high levels of stress, in particular along the longitudinal axis of the recirculating ball screw 3, and to make handling easy and fast when changing working heads.

The fastener means 62, 63 can be made in numerous ways, such as, for example using a bayonet assembly or an axial snap-fastening mechanism provided with a plurality of radially-movable locking balls.

Figure 9:
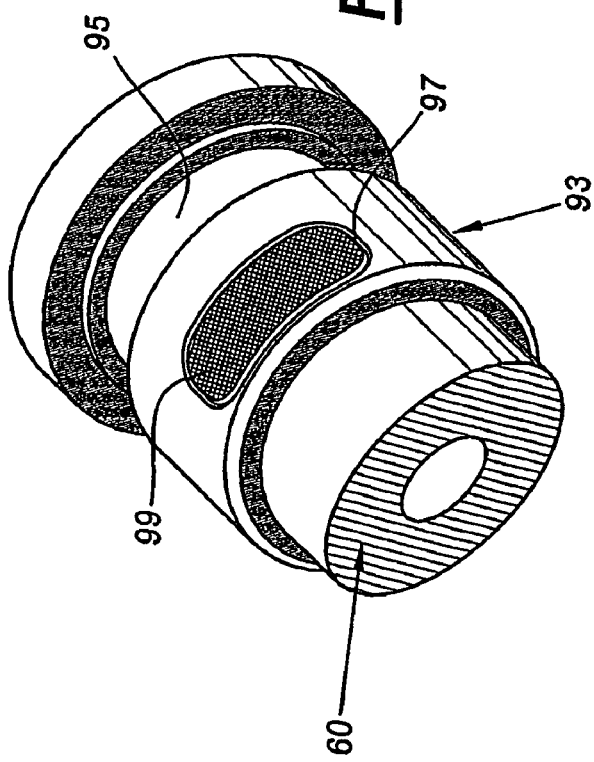
FIG. 9 is a perspective view of means for fastening a working head.

One particular embodiment of the fastener means 62, 63 is described below with reference to FIGS. 7, 8, and 9.

The fastener means 63 of the working head are constituted by a hollow cylinder 90 having an annular groove 91 around its periphery. The inside diameter of the hollow cylinder 90 is suitable for passing the recirculating ball screw 3 without stress. The right or proximal end of the cylinder 90 includes a chamfer 92.

The fastener means 62 of the portable linear actuator 1 comprise an annular ring 93 that screws at 94 onto a hollow cylindrical endpiece 95 of the portable linear actuator 1. The inside diameter of the cylindrical endpiece 95 is adapted to enable the cylinder 90 of the fastener means 63 of the working head to slide therein. The axes of the recirculating ball screw 3, of the cylindrical endpiece 95, and of the annular ring 93 coincide. Thus, the recirculating ball screw 3 is placed in the hollow cylindrical end 95 with a large amount of clearance.

In front of the endpiece 95, the annular ring 93 has an inside groove 96 connected over a fraction of its perimeter to the outside surface of the annular ring by a slot 97.

A normally eccentric annulus 98 is housed in the inside groove 96. It includes an element 99 that projects radially outwards, and that is adapted to slide in the slot 97. Opposite from the slot 97, a spring 100 is placed between the bottom of the groove 96 and the annulus 98 so as to urge the annulus towards the slot 97, towards an eccentric limit position where it is in abutment against an end step 95A of the endpiece 95.

The annulus 98 also has on its inside surface a collar or collar portion 101 including a chamfer 102 on its left-hand side.

Operation of the fastener means is described below:

The working head 60 is positioned by the operator in front of the fastener means 62 of the actuator 1 in such a manner that the end of the cylinder 90 engages in the annular ring 93 and the recirculating ball screw 3 engages in the end of the cylinder 90. By pushing the working head 90 towards the actuator 1, the chamfered end 92 comes to bear against the chamfer 102 of the annulus 98 and pushes it radially until it moves onto the general axis (downwards in FIG. 7), thus enabling the cylinder 90 to pass through until the annular groove 91 is in register with the collar 101. Under drive from the spring 100, the collar 101 is received in the annular groove 91, thereby locking the working head 60 in position. A radial shoulder 104 of the head 60 adjacent to the cylinder 90 is then pressed firmly against the radial front face 103 of the ring 93.

To change the head, the operator pushes back the annulus 98 by pressing on its projecting portion 99, thereby disengaging the collar 101 from the annular groove 91 and enabling the working head 60 to be released.

The annulus 98 thus behaves like a sliding catch that becomes inserted in the annular groove 95 to fasten the working head.

This mechanism advantageously enables the working head 60 to have a degree of freedom in rotation about the linear actuator.

It is thus possible to fit numerous heads for working tubes on the actuator 1, such as heads for increasing the diameter of the tube, or for press fitting a tube radially or axially, or for cutting through a tube, without this list being limiting.

By way of example, a plurality of working heads are described below.

Figure 11:
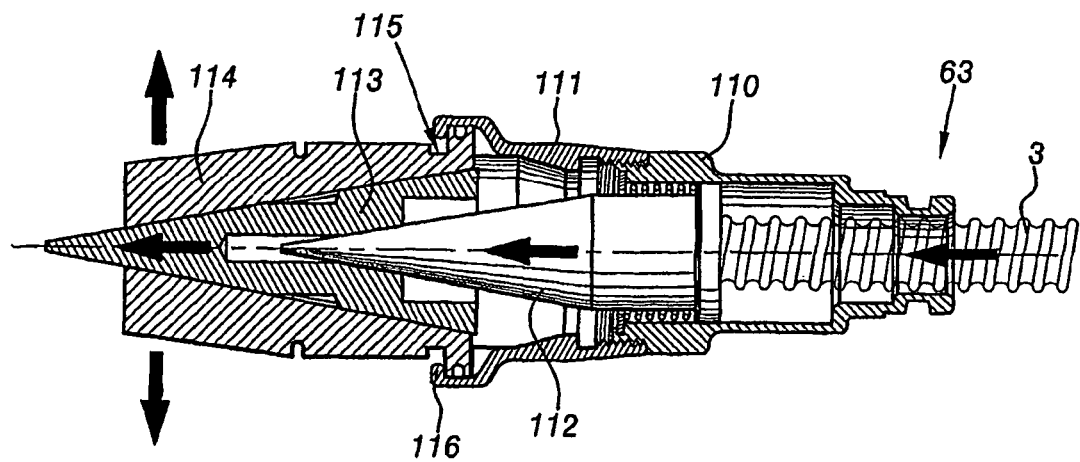
FIG. 11 is an axial section view of a working head for radially expanding a tube.

A first working head, FIG. 11, serves to provide localized expansion of a tube. This radial expansion head operates on a principle that is well known and is therefore described only briefly.

It has fastener means 63 as described above, forming part of a cylindrical body 110. This body is extended forwards by a screwed-on ring 111.

A pusher 112 having a conically-shaped front end slides inside the body and bears via a conical part 113 against the inside faces of sectors 114, e.g. six sectors, forming a frusto-conical nose. These sectors 114 can pivot in relatively limited manner about respective annular grooves 115 provided at their rear ends, having an inwardly-directed radial collar 116 formed at the front end of the ring 111 engaged therein.

The nose made up of sectors 114 is positioned so as to press against the inside periphery of a tube, as represented by arrows, and the recirculating ball screw 3 pushes the conical part 112 forwards, thereby pushing the part 113 forwards, which has the effect of moving the elements 114 radially apart, away from their rest position, thereby locally increasing the diameter of the tube.

Figure 12:
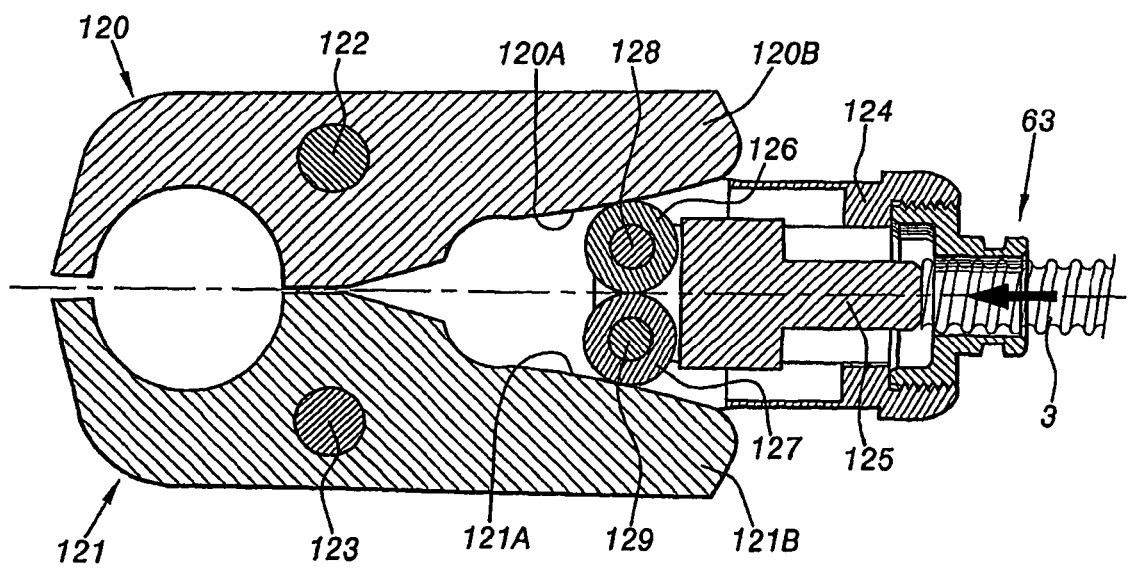
FIG. 12 is an axial section view of a working head for radially press fitting a tube.

A second working head, FIG. 12, is a radial press fitting head. Fundamentally similar to a hand press fitter, it comprises two jaws 120 and 121 hinged about two parallel pins 122, 123 carried by a body 124, the body having the fastener means 63 at its rear end. A pusher 125 slidably mounted inside the body carries two wheels 126, 127 at its front end, which wheels are mounted on two rotary pins 128, 129 parallel to the pins 122, 123. The two wheels bear against the inside cam-forming surfaces 120A, 121A of the rear arms 120B, 121B of the jaws.

As represented by the arrows, by pushing the sliding pusher 125 forwards, the recirculating ball screw 3 causes the arms 120B, 121B of the jaws to move apart under drive from the wheels 126, 127, thus enabling the jaws to clamp together, thereby radially press fitting a tube disposed between them.

Figure 13:
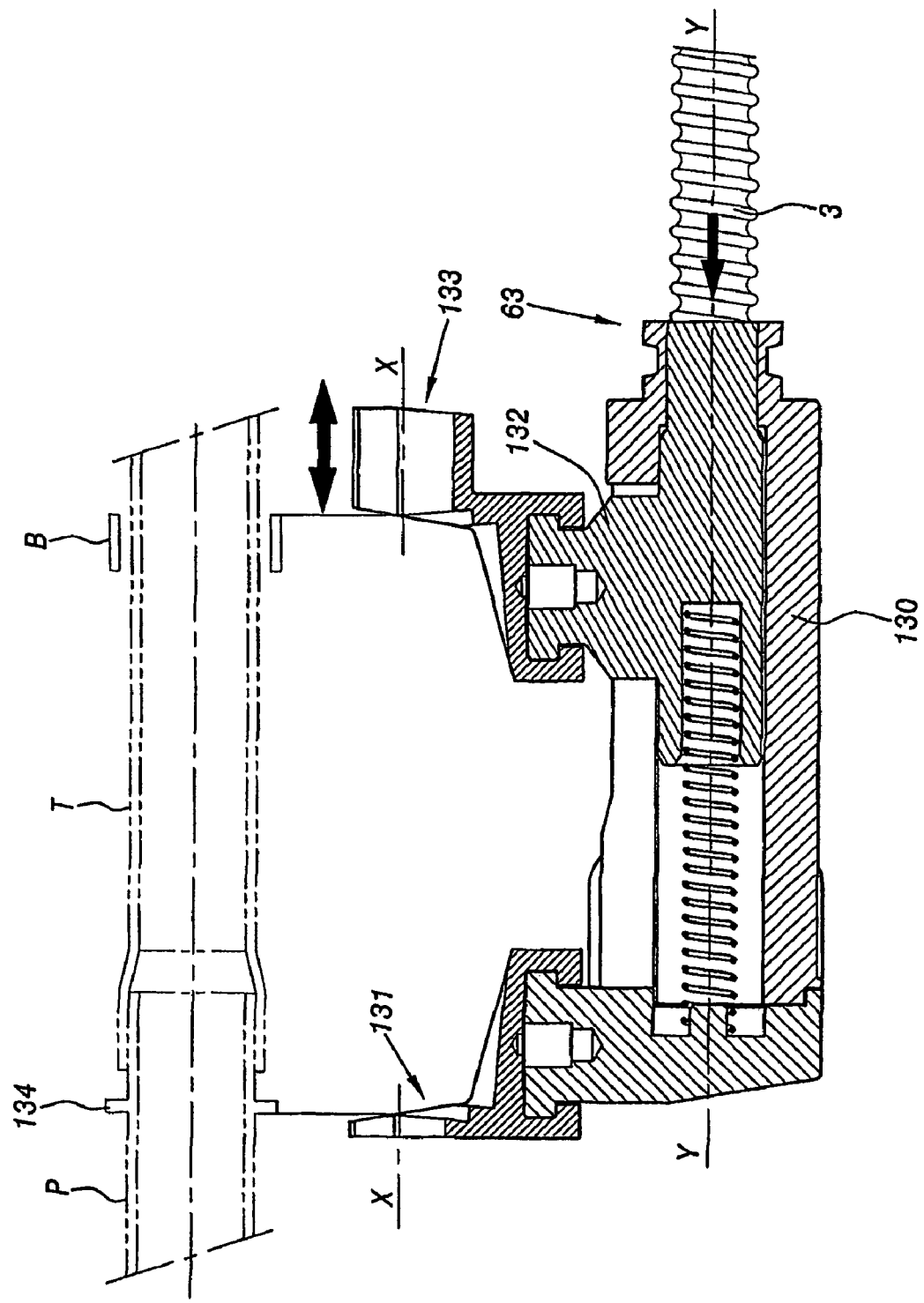
FIG. 13 is a longitudinal section view of a working head for in-line axial press fitting.

A third working head, FIG. 13, is an in-line axial press fitting head. Axial press fitting, also referred to as "ring-pushing", consists in positioning a ring B in such a manner that it creates a firm connection between the tube T and a connection part P. After expanding the end of the tube, the part P is engaged in the flared end of the tube, and the ring B slides freely thereover.

The head has two main parts: a body 130 which carries a stationary jaw 131 at its front end and the fastener means 63 at its other end, and a moving part 132 provided with a second jaw 133 adapted to slide inside the body 130. Each jaw forms a semicircular cradle for receiving the part P and the tube, the tube cradles sharing a common axis X-X parallel to the sliding direction Y-Y of the part 132.

The recirculating ball screw pushes the second part 132 thus enabling the two jaws 131 and 133 to move towards each other, enabling the end of the tube to come into abutment against an outside collar 134 on the part P, and enabling the ring B to be forced onto the part P clamping the end of the tube tightly on the part P in order to provide a leaktight connection.

Of operation that is very simple, this tool suffers from the drawback of needing to be positioned together with the portable linear actuator 1 on the axis of the tube. This can be a drawback if the operation is performed in a confined space having very little room on the axis of the tube on which work is to be carried out.

Figure 14:
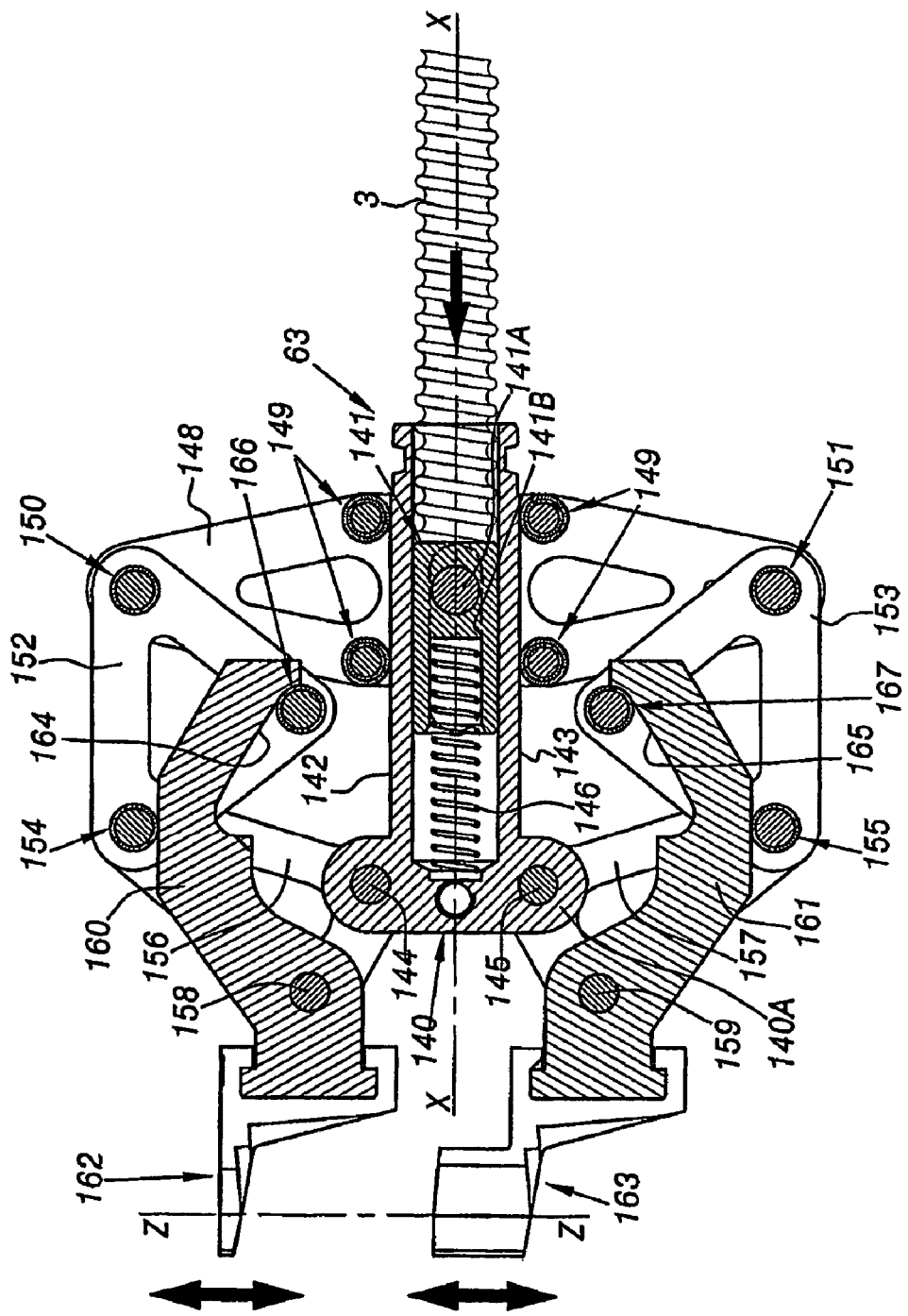
FIG. 14 is a longitudinal section view of another working head for orthogonal axial press fitting.

In order to solve this problem, the head of FIG. 14 enables a tube to be press fitted axially while the tool is held perpendicularly to the axis of the tube.

This head, FIG. 14, operates in a general plane corresponding to the plane of the figure.

It comprises a stationary body 140 that is generally T-shaped with the foot of the T-shape including the fastener means 63.

The body 140 is hollow so as to allow a part 141 to slide therealong on the displacement axis of the recirculating ball screw 3. Two opposite sides of the body define two plane and parallel surfaces 142, 143.

The solid front portion 140A of the stationary body 140 has two rotary pins 144 and 145 at its ends, extending perpendicularly to the plane of the movement.

Inside the body, a return spring 146 connects the body to the sliding part 141, urging it rearwards.

A part 148 that is symmetrical about the displacement axis X-X of the ball screw 3 and that is substantially lozenge-shaped has its short diagonal parallel to the displacement axis of the part 141. This part is secured to the moving part 141 by a rod 141A that is guided in two opposite slots 141B in the body 140. The part 148 has four guide wheels 149 that run along surfaces 142 and 143 of the body.

At two ends corresponding to the long diagonal of the lozenge-shaped part 148 there are two triangular parts 152 and 153 that are symmetrical to each other about the axis X-X, and that are hinged about two rotary pins 150, 151.

These two parts 152 and 153 are substantially in the form of isosceles triangles having their bases substantially parallel to the body of the stationary part 140 when the head is in the open position and having their apexes lying between their bases and the stationary body 140.

The first ends of these bases are hinged on the pins 150, 151 of the lozenge-shaped part, while their second ends carry respective rotary pins 154, 155 having another pair of mutually symmetrical triangular parts 156, 157 fitted thereto.

The two parts 156, 157 are likewise substantially in the shape of isosceles triangles.

Their apexes are hinged about the pins 154, 155. The first ends of their bases are hinged about the pins 144, 145 of the stationary body 140, and the second ends of their bases carry rotary pins 158, 159 on which two arms 160 and 161 are hinged. In front, these arms carry jaws 162, 163 for receiving the tube and the part to be engaged in the tube.

These jaws 162, 163 are identical to the jaws 131, 133 of FIG. 13, their cradles of axis Z-Z being perpendicular to the axis X-X of the body 140. They are mounted differently so as to enable press fitting to be performed close to a wall.

The guide arms 160, 161 themselves have two inner cam surfaces 164, 165 at their right-hand ends over which there slide guide studs 166, 167 that are positioned at the apexes of the first pair of triangles 152, 153. The surfaces 164, 165 are inclined and converge rearwards.

This working head operates as follows.

At rest, the sliding part 141 is at the rear end of the stationary part 140 and the jaws 162, 163 are open, being spaced apart from each other (FIG. 14).

By pushing against the sliding part 141, the recirculating ball screw 3 moves it forwards together with the lozenge-shaped part 148 to which it is secured, and thus pushes the lozenge-shaped part towards the front of the stationary body 140.

This forward displacement also pushes the first pair of triangles 152, 153 which in turn push the ends of the second pair of triangles 156, 157 that are connected thereto towards the left.

These parts 156, 157 with their apexes secured to the stationary body 140 serve to transform the movement in translation into movement in rotation that brings the pins 158, 159 towards each other.

However, it is clear that for mutual engagement to be effective, it is necessary for the two jaws 162, 163 to remain parallel to each other throughout this movement in rotation.

That is the purpose of the guide arms 160, 161. The opposing force exerted by the tube and its connection part exerts a rotary couple in the direction opposite to the rotation of the parts 156, 157. Thus, the guide arms 160, 161 are held pressed against the studs 166, 167 along their surfaces 164, 165.

The shape of these surfaces 164, 165 is specially adapted to ensure that at all times during the movement, the jaws 162, 163 remain parallel to each other.

Advantageously, this working head thus makes it possible to make a joint while keeping the tool perpendicular to the tubes to be joined together, making it possible to operate even when the tube is already fixed to a wall or situated in an environment that is difficult of access.

This working head preferably operates together with the portable linear actuator described above. Nevertheless, the person skilled in the art knows how to adapt this head without difficulty to other actuators capable of generating linear movement, such as electro-hydraulic actuators.

It will be understood that in a variant, other heads for working tubes could be used together with the portable linear actuator 1, e.g. a guillotine type of head for cutting a tube.

The portable tool described thus makes it possible by means of its recirculating ball screw to deliver a large force by electromechanical means of small weight while using a motor powered by a battery.

The invention claimed is:
1. A portable linear actuator comprising:
   a DC electric motor delivering rotary drive to a screw via a stepdown gearbox;

an electronics module for controlling said DC electric motor, said electronics module including current acquisition means, derivative calculation means and comparator means; and interrupter means, wherein said current acquisition means acquires an instantaneous current value of a power supply current supplied to said DC electric motor, wherein said derivative calculation means calculates a time derivative of values of the power supply current, said derivative calculation means being connected to said comparator means, wherein said comparator means compares the calculated time derivative with a first predetermined value, and wherein said comparator means controls said interrupter means to interrupt the power supply current when the calculated time derivative is greater than the first predetermined value.

2. A portable linear actuator according to claim 1, wherein said current acquisition means includes sampling means for sampling the instantaneous current value at regular intervals, said current acquisition means being connected to storing means for storing the samples of the instantaneous current value over a moving time window of a predetermined duration, and wherein said derivative calculation means includes difference calculating means for calculating a difference between a value of a most recent sample sampled by said sampling means and a value of an oldest sample sampled by said sampling means in the time window, and includes comparator means for comparing the difference calculated by said difference calculating means with the first predetermined value.

3. A portable linear actuator according to claim 1, wherein said electronics module further comprises second comparator means for comparing a value of the power supply current with a second predetermined value, and for controlling said interrupter means when the value of the power supply current is greater than the second predetermined value.

4. A portable linear actuator according to claim 1, wherein said electronics module further comprises timer means that activates said interrupter means only after a predetermined time has elapsed after the portable linear actuator has been started.

5. A portable linear actuator according to claim 1, further comprising end-of-stroke sensors for sensing a stroke of the screw and being connected to said electronics module, such that said interrupter means is activated when said end-of-stroke sensors sense that the screw is at an end of a stroke.

6. A portable linear actuator according to claim 1, wherein the screw includes an anti-rotation pin at one end thereof, and one end of the anti-rotation pin carrying a magnet, and wherein the portable linear actuator includes Hall effect sensors detecting a passage of the magnet and being positioned such that the passage of the magnet indicates that the screw is at an end of a stroke.

7. A portable linear actuator according to claim 6, wherein said Hall effect sensors are positioned on an electronics card having a plurality of locations for positioning sensors that are adapted, to different displacement strokes of the screw.

8. A portable linear actuator according to claim 1, wherein the screw is a recirculating ball screw and said DC electric motor is powered by a battery.

9. A portable linear actuator according to claim 1 being used in a machine-part puller for bearings, or used in a tool for working on tubes by expanding the tubes.

10. A method of controlling an electric motor of a portable linear actuator in order to limit a maximum force generated from the electric motor, the method comprising:

acquiring a value of a power supply current supplied to the electric motor at regular intervals;

calculating a derivative of the value of the power supply current as a function relative to time; and comparing the calculated derivative to a first predetermined value and, when the calculated derivative is greater than the first predetermined value, interrupting the power supply current supplied to the electric motor.

11. A method according to claim 10, wherein the value of the power supply current is acquired at regular intervals, and wherein the calculating of the derivative is approximated by calculating a difference between the value of the power supply current from a most recent acquisition by the acquiring of the value and the value of the power supply current from an oldest acquisition by the acquiring of a value in a moving time window.

12. A method according to claim 10, farther comprising:

comparing the acquired value of the power supply current with a second predetermined value; and subsequently interrupting the power supply current when the value of the power supply current is greater than the second predetermined value.

13. A method according to claim 10, wherein the calculating of the derivative and the comparing are activated only after a predetermined time has elapsed after the electric motor has staffed.

14. A portable electromechanical tool for working on tubes, said portable electromechanical tool comprising:

a portable linear actuator according to claim 1;

first fastener means;

a first working head adapted to perform a first task on a tube; and a second working head adapted to perform a second task on a tube, the second task being different from the first task, wherein the first working head and the second working head include second fastener means, wherein the first fastener means and the second fastener means of the first working head and the second working head are adapted to co-operate to fasten the first working head and the second working head to the portable linear actuator such that the portable linear actuator generates movement in translation of a predetermined portion of the first working head and the second working head fastened to the portable linear actuator.

15. A portable electromechanical tool according to claim 14, wherein the first working head and the second working head are adapted to perform at least one of the following tasks:

radial expansion of a tube;

axial expansion of a tube;

cutting a tube;

in-line axial press fitting;

orthogonal axial press fitting; and radial press fitting of a tube.

16. A portable electromechanical tool according to claim 15, wherein the first working head and the second working head are each adapted to perform only one task of the first task and the second task.

17. A portable electromechanical tool according to claim 15, wherein one of the first working head and the second working head is adapted to perform axial press fitting of a tube in a movement that is orthogonal to the movement in translation generated by the portable linear actuator.

18. A portable electromechanical tool according to claim 17, wherein the one working head adapted to perform the axial press fitting includes a T-shaped stationary support having as a foot the second fastener means and having in a body thereof a bore suitable for allowing the screw to slide therein and defining a displacement plane for movable means suitable for transforming movement in translation generated by the screw along the body of the stationary support into movements in rotation of two jaw-carrier arms about two pins perpendicular to the displacement plane and positioned at ends of the one working head, and includes means for holding two jaws in parallel during the movements of the two jaw-carrier arms.

19. A portable electromechanical tool according to claim 18, wherein the movable means are symmetrical about the displacement axis of the screw and comprise first elements moving in translation along the body of the stationary support and secured to the screw, the movable means being connected via first rotary pins to second elements, the second elements being connected by second rotary pins to third elements mounted to pivot about rotary pins of the one working head, and wherein the two jaw-carrier arms are hinged about third rotary pins of the third elements, the two jaw-carrier arms including camming ramps that co-operate with cam followers carried by said second elements in order to maintain the jaws in parallel during the movements of the two jaw-carrier arms.

20. A portable electromechanical tool according to claim 14, wherein the first fastener means include a sliding catch for sliding along an axis perpendicular to the movement in translation of the screw, the catch being adapted to be inserted in an annular groove of the second fastener means so as to fasten the first working head and the second working head to the portable linear actuator while enabling the first working head and the second working head to rotate freely about the screw.

21. A portable electromechanical tool according to claim 20, wherein the sliding catch comprises an annulus urged towards an eccentric position so as to be inserted in the annular groove.

* * * * *